United States Patent [19]

Pohlhausen

[11] 4,422,408
[45] Dec. 27, 1983

[54] SHIELDING DEVICE FOR THE TEMPERATURE AND POLLUTION CONTROL OF WATER IN A FARMING ENCLOSURE FOR FISH AND OTHER AQUATIC ORGANISMS

[76] Inventor: Henn Pohlhausen, Friedrichstr. 56, D-2110 Buchholz in der Nordheide, Fed. Rep. of Germany

[21] Appl. No.: 233,098

[22] Filed: Feb. 10, 1981

[30] Foreign Application Priority Data

Feb. 12, 1980 [DE] Fed. Rep. of Germany ....... 3005150

[51] Int. Cl.³ ............................................. A01K 63/00
[52] U.S. Cl. ........................................................ 119/3
[58] Field of Search ............................ 119/3, 1, 2, 4, 5

[56] References Cited

U.S. PATENT DOCUMENTS

| | | | |
|---|---|---|---|
| 3,240,186 | 3/1966 | Dobell | 119/1 |
| 3,653,358 | 4/1972 | Fremont | 119/3 |
| 3,698,359 | 10/1972 | Fremont | 119/3 |
| 4,044,720 | 8/1977 | Fast | 119/3 |
| 4,182,268 | 1/1980 | Berger | 119/3 |
| 4,237,820 | 12/1980 | Muller | 119/3 |
| 4,271,788 | 6/1981 | Knowles | 119/3 |

Primary Examiner—Hugh R. Chamblee
Attorney, Agent, or Firm—Thomas H. Whaley

[57] ABSTRACT

A shielding device for adjusting and maintaining constant optimum temperature conditions and/or for pollution controlling the water in a farming enclosure for fish and other aquatic organisms, comprising a warm water shield to prevent the warmer water of lower unit weight from flowing off laterally, and a cover for the warm water shield, and a cold water shield to prevent the cooler water of higher unit weight from flowing off laterally, and a lower bottom portion constructed as a collecting funnel to collect faeces and food scraps, and optionally a connecting netting to prevent the fish kept within the device from escaping, in which each of said warm water shield, said cold water shield, and said pollution control unit, may also be used independently, and, if desired, the device may be protected from ice drift and gales by being lowered.

10 Claims, 9 Drawing Figures

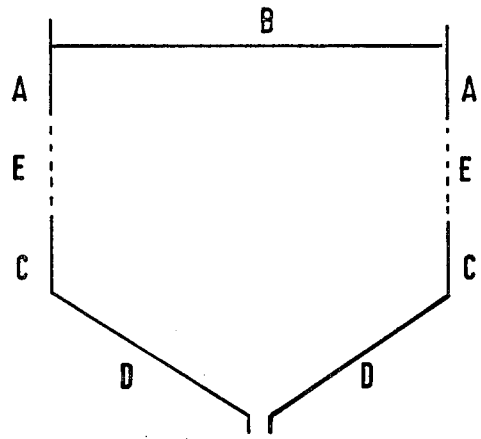
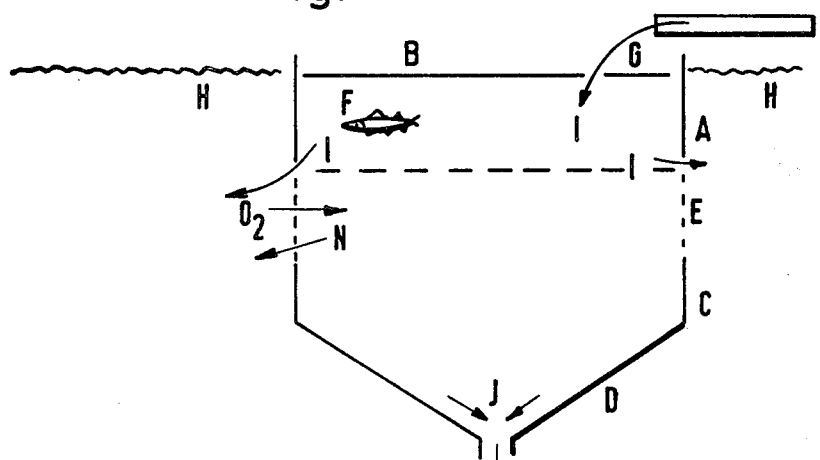
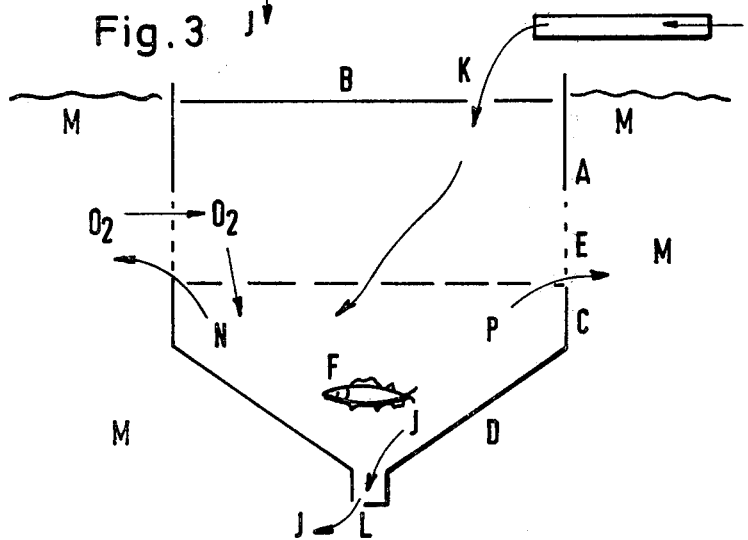

SHIELDING DEVICE FOR THE TEMPERATURE AND POLLUTION CONTROL OF WATER IN A FARMING ENCLOSURE FOR FISH AND OTHER AQUATIC ORGANISMS

The present invention relates to a system for retaining warmer and/or cooler water within a shielding device whereby energy losses are reduced and optionally the water within said shielding device and/or the water surrounding the same is kept clean.

It has been known to farm fish in lakes etc. within netted enclosures (cf. PROSKE, CHR., 1978, Zur Produktion von SüBwasserfischen in der Bundesrepublik Deutschland, Kali-Briefe Briefe (Bütehof) 14(6), p. 386), wherein both too high and too low temperatures of the outer water may reduce, or even exclude, production in enclosures (cf. EDWARDS, D.J., 1978, Salmon and Trout Farming in Norway, Norwich, pp. 21 and 79 to 99). This is why, for instance, the most valuable fish, the Atlantic Salmon (*Salmo salar*), may be kept in enclosures in Northern and Western Europe only in protected bays in the immediate vicinity of the Gulf Stream (cf. EDWARDS, loc. cit., pp. 2 to 7). The keeping of fish in enclosures within landlocked lakes, which has been practiced so far, is to be rejected, because the biological equilibrium may be affected by the high pollution rate (cf. PROSKE loc. cit., p. 386).

It has further been known to keep fish, e.g. salmon, in ponds or enclosures under the influx of large amounts of heated water, for instance from power plants (cf. EDWARDS loc. cit., pp. 25/26). This flow process entails considerable consumption of energy and can only be realised where inexpensive waste heat is available, wherein the purification of the water surrounding the enclosure poses problems of pollution control (cf. PROSKE loc. cit., p. 387).

Warm-water systems employing a recirculating process are at present being tested, but so far no practicable and economic solution of the problem of rendering inoffensive any pollutants in closed plants for fish as a whole, and particularly for salmonids, has been found (cf. PROSKE loc. cit., p. 387), and that primarily because pollution control of the circulating water with respect to hardly degradable fish excrements poses great technical difficulties (cf. BOHL, M., 1976, Aquakulturexperimente im Wasserkreislauf—Grundlagen und Erfahrungen; Fortschritte in der Aquakultur und die Belastung der Gewässer durch Intensivzucht und MaBnehmen zu ihrer Bekämpfung; Arbeiten des Deutschen Fischerei-Verbandes, No. 19, pp. 142 to 151).

It is furthermore been known to breed fish in plastics containers, wherein optionally the water may be heated by the introduction of steam (cf. H. POHLHAUSEN, Lachse in Teichen, Seen, Flüssen und Bächen, Paul Parey-Verlag 1978, pp. 103 and 116).

Up to the present, however, it has not been possible in a farming enclosure either to control the temperature thereof or to provide for satisfactory waste disposal.

It is the object of the present invention to maintain the temperature of the water in the farming enclosure within a shielding device—at low expenditure and only slight energy loss—at a desired level above or below the temperature of the water surrounding the shielding device and, if required, to facilitate pollution control of the breeding space and also to ensure the safety of the system in case of ice drift and gales.

In accordance with the present invention this object is solved by a shielding device which comprises: an upper portion constructed as a warm water shield to prevent lateral flow-off of the warmer water having a lower unit weight, a cover for the warm water shield to prevent the water from flowing off upwardly and also to reduce cooling of the warmer water as caused by heat dissipation and thermal conduction, a central portion constructed as a cold water shield to prevent lateral flow-off of the cooler water having a higher unit weight, and a lower bottom portion constructed as a collecting funnel which is tapered downwardly and at its lowest point is provided with an outlet, said lower portion preventing the cooler water of normally higher unit weight from sinking down while at the same time collecting the still heavier faeces and food scraps, and optionally a connecting netting preventing the fish kept within the device from escaping while at the same time permitting an exchange of substances dissolved in the water between the water contained within the device and the outside water.

According to the invention water is introduced into the device at a controlled temperature in amounts that are best suited for a profitable farming so as to achieve desired temperature conditions in the enclosure, and by making use of the different unit weights of the water at different temperatures the water is retained within the shield, which is partially closed to the water, so that warmer water is retained in a downwardly open and colder water in an upwardly open space partially defined by a water-impermeable shield.

To keep the enclosure and the shielding device, respectively, as well as the water receiving the same clean, faeces and food scraps are sucked off from the lower funnel-shaped portion of the shielding device.

The pollution control is facilitated by the collection of faeces and food scraps. Moreover, the disposal of pollutants dissolved in the water, e.g. urine, may take place by diffusion into the outer water. The supply of the fish and other organisms within the shielding device may also take place by diffusion with oxygen dissolved in the water.

Fish serving as food and nutrient organisms existing in the surrounding water may swim into the shielding device; experience has shown that they are attracted by the faeces, by food scraps and by the favourable water temperature within the shielding device, so that they serve as useful additional natural food for the larger fish retained within the shielding device.

In case of ice, ice drift, or a gale the device may be lowered to safe depths so as to prevent destruction of the device.

The advantages obtained with the invention particularly reside in (1) that the maintenance of a constant and favourable temperature within the shielding device permits farm breeding independent of external temperatures with a considerably increased and ensured production per annum as compared to conventional methods, (2) that farming in enclosures will become possible in waters which so far on account of their temperature conditions were unsuited for certain types of fish, (3) that farming in enclosures will become possible even in bodies of water the quality of which so far prohibited breeding in enclosures, (4) that the easy and safe pollution control of the enclosure renders farming in enclosures unobjectionable where so far it could not be permitted on account of too heavy environmental nuisance, (5) that warm-water farming, which so far was possible only either at great expenditure of energy or when large amounts of waste heat were available, will now be profitable also under normal conditions, (6) that in addition to farming in enclosures, and with appropriate operation, also wild fish and fish kept in ponds will in times of emergency find shelter from either too high or too low temperatures, thus preventing fish mortality and permitting an overall increase in production, (7) that it permits an additional fattening of trout in a conventional carp pond beside the raising of carp, thus considerably increasing the production of the farm, and (8) that it permits protection of the fish kept in enclosures from ice drift and gale by anchoring the shielding device, if required, at a suitable depth below the surface of the water, thereby considerably reducing the risks as compared to conventional breeding in enclosures.

The walls of the shielding device are to consist of substantially water-impermeable and substantially heat-insulating material, e.g. boards, sheets or fabrics, which especially permeably permit the exchange of oxygen and/or the exchange of substances dissolved in the water.

The following examples and the FIGS. 1 to 9 are intended to explain the invention.

FIG. 1 is a diagrammatic elevational view of one embodiment of a shielding device for the temperature and pollution control of water in a farming enclosure for fish and other aquatic organisms in accordance with the present invention.

FIGS. 2, 3 and 4 are diagrammatic elevational views of the embodiment of FIG. 1 disposed in and surrounded by a body of water.

Figure 4:
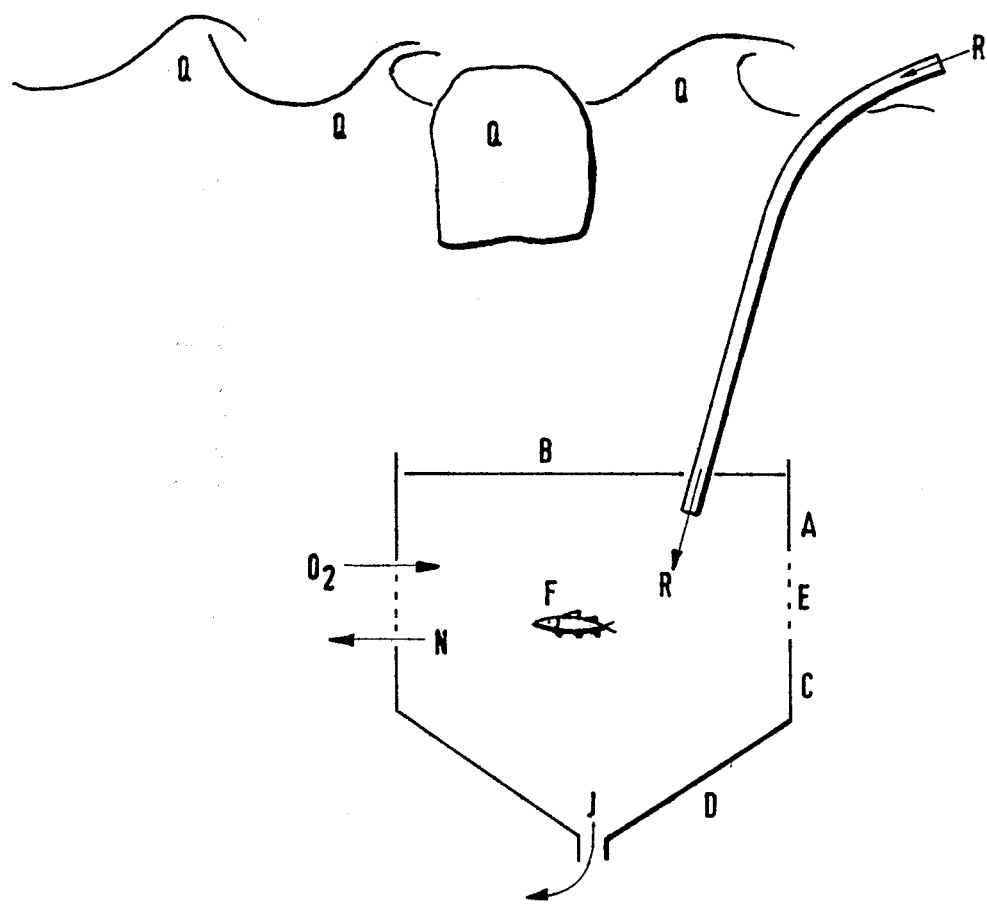

With reference to the figures, a number of examples of the various embodiments of the shielding device are illustrated. In FIG. 1, the shielding device comprises an upper warm water shield A to prevent lateral flow-off of warm water having lower unit weight which may be provided with a cover B to prevent the water from flowing off upwardly and also to reduce cooling of the warmer water by heat dissipation and thermal conduction. A cold water shield C disposed below the warm water shield prevents lateral flow-off of the cooler water having a higher unit weight than the warmer water in warm water shield A; cold water shield C is provided with a lower bottom portion constructed as a collecting funnel D which is tapered downwardly and at its lowest point is provided with an outlet. The lower portion prevents the cooler water of normally higher unit weight from sinking down and escaping from the enclosure while at the same time collecting the faeces and food scraps which otherwise would pollute the surrounding water. The upper or warm water shield is connected to the cold water shield by a connecting netting E preventing the fish kept within the device from escaping while at the same time permitting an exchange of substances dissolved in the water between the water contained in the device and surrounding outside water.

FIG. 2 illustrates a practical example of the production of fish at low external temperatures with the shielding device illustrated in FIG. 1. In this example, fish in the enclosure tend to stay in the warm water shield A which is supplied through inlet G with water warmer than that in the surrounding body of water H from a suitable source, not illustrated. The surrounding body of water H is cooler, e.g. 4° C., than the warmer, lighter water I, e.g. 15° C., contained within the warm water shield A. Water containing faeces and food scraps is withdrawn at J from the lowermost portion of collecting funnel D. The connecting netting E permits some exchange of waters with the colder water from the surrounding body of water H through the connecting netting whereby pollutants N dissolved in water in the enclosure may be carried away and water containing dissolved oxygen $O_2$ may enter the enclosure.

The warmer water I is collected and retained in the warm water shield A. Faeces and food scraps J left by the fish F are collected in the collecting funnel D and discharged. The exchange between the pollutants N and the oxygen $O_2$ takes place through the meshes of the connecting netting E. Even in case of low external temperatures the fish may be kept at optimum temperatures in clean and oxygen-enriched water.

A practical example of fish farming at high external temperatures utilizing the shielding device of FIG. 1 is illustrated in FIG. 3. With reference to FIG. 3, fresh water colder than the surrounding body of water M which has, for example, a temperature of 30° C., is introduced through inlet K into the water in the enclosure device which is surrounded by the warm water shield A. A barrier means L is provided at the outlet from the bottom of cold water shield C for regulating the outflow of contaminated water J. The volume of colder water introduced through inlet K is greter than the volume of waste water flowing out past barrier means L.

The cooler water P having a greater unit weight is collected and retained in the cold water shield C and the collecting funnel D. Faeces and food scraps J are collected in the collecting funnel D and discharged through the barrier means L. The exchange between the pollutants N and the oxygen $O_2$ takes place through the meshes of the connecting netting E. Even in case of excessive external temperatures the fish F may be kept at optimum temperatures in the clean and oxygen-enriched water.

A practical example of fish farming at an ice-free and gale-protected depth in winter is illustrated in FIG. 4 wherein the entire enclosure illustrated in FIGS. 1 to 3 is submerged below the surface of the surrounding body of water. The enclosure device may be provided with auxiliary means, not illustrated, to permit lowering and raising of the shielding device. In this figure, the symbol Q designates the surface of the water with waves and ice. Fresh water may be supplied to the enclosure, as required, through the inlet R.

The shielding device of FIG. 1 is anchored at a safe depth and is operated as shown in FIG. 2. Food for the fish F is introduced into the device with the fresh water supply R.

Figure 5:
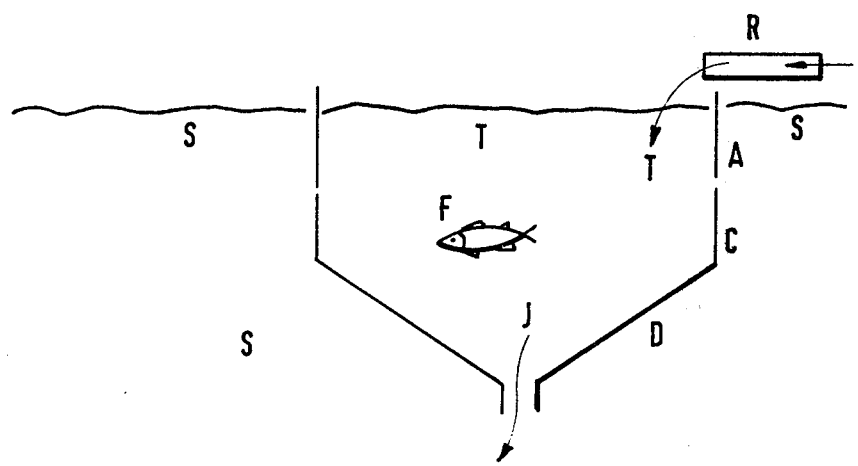
FIG. 5 is a diagrammatic elevational view of another embodiment of a shielded enclosure disposed in aquatic environment.

A practical example for fish farming in waters harmful to fish is illustrated in FIG. 5. The symbol S in the figure represents water harmful to fish contained within the enclosure while T represents water suitable for fish farming which is introduced through inlet R into the warm water shield A of the enclosure device.

The water T suitable for fish is collected and retained within the shielding device. Within the space through which the suitable water passes the fish are protected from the harmful water S of the surrounding body of water.

Figure 6:
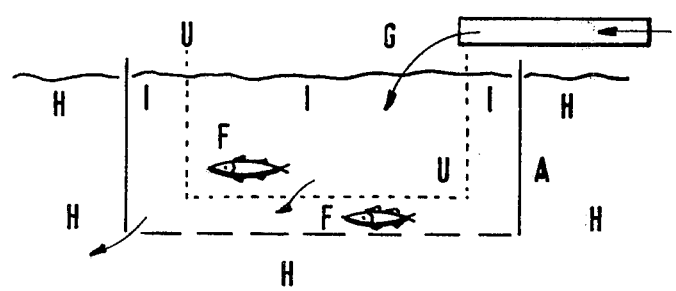
FIG. 6 is a diagrammatic elevational view of still another embodiment of a shielding device forming a part of this invention.

A practical example for keeping a conventional fish cage or enclosure warm is illustrated in FIG. 6, wherein a conventional fish enclosure or netted enclosure U is surrounded by a warm water shield A.

At excessively low external temperatures the water surrounding a conventional netted enclosure and the water I within the fish enclosure U is kept sufficiently warm to be most beneficial to the fish. Free fish may also come to the warmer water within the warm water shield A, which is open towards the bottom, and may stay within the shield A but outside of the netted enclosure U in the area of optimum warmth, whereby an improved efficiency of growth increase as well as a decrease in the susceptibility to diseases can be achieved. At the same time, the warmer water I forms an artificial epilimnion of limited extent.

Figure 7:
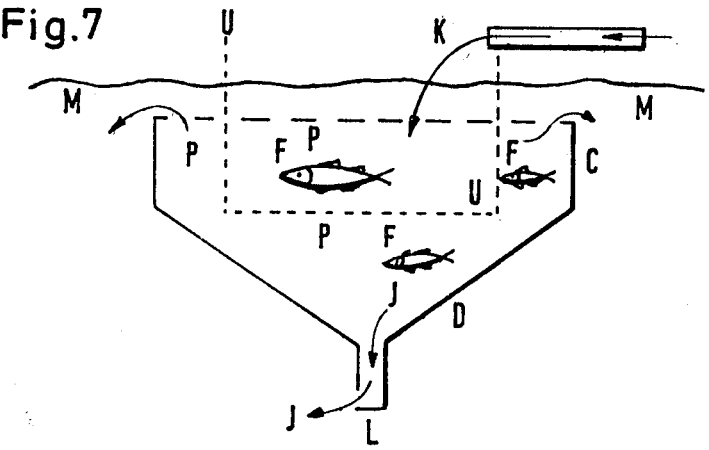
FIG. 7 is a diagrammatic elevational view of a modification of the device of FIG. 3.

A practical example for keeping a conventional netted enclosure cool in the summer and for protecting free fish from heat by forming a spatially limited hypolimnion rich in oxygen is illustrated in FIG. 7.

The cooler and heavier water P is collected and retained within the cold water shield C and the collecting funnel D. At excessively high external temperatures the water surrounding a conventional fish enclosure U and the water within the enclosure is kept sufficiently cool so as to be most beneficial to the fish. Free fish also may come to the cooler water within the cold water shield D, which is open towards the top. At the same time, the colder water P forms an artificial hypolimnion rich in oxygen and of limited extent.

Figure 8:
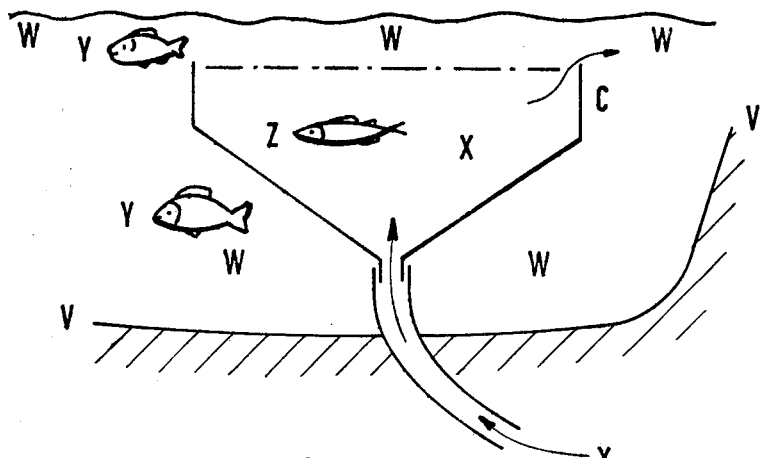
FIGS. 8 and 9 are diagrammatic elevational views, partly in cross section of further embodiments of shielding devices forming a part of this invention.

A practical example for collecting ground water or water from a spring or a brook so as to provide a refuge for cold and clear water fish in a warm or eutrophic body of water is illustrated in FIG. 8.

In this figure, the symbol V represents the bottom of a pond and the symbol W represents warm, eutropic pond water surrounding the fish enclosure which comprises a cold water shield C with a funnel bottom as in FIG. 1. Cooler spring or ground water X is introduced into the enclosure to maintain a body of cooler water X within the enclosure. Cold water fish Z, e.g. trout, are retained within the cold water shield C while warm water fish Y, e.g. carp, may be grown in the warmer pond water surrounding the enclosure.

Cooler spring water is collected and retained within the cold water shield C and the collecting funnel D; shield and funnel are disposed within a warm carp pond. Here, the carp pond can be utilized for raising carp, while the cold water shield may be utilized for the fattening of trout, thus permitting a saving of space and cost.

Figure 9:
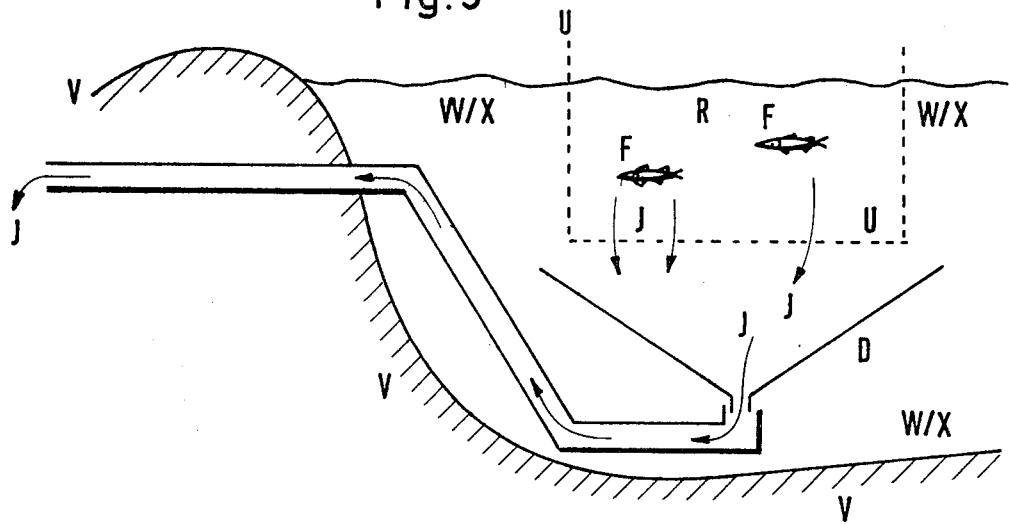

A practical example for keeping clean a body of water in which fish are raised in netted enclosure is illustrated in FIG. 9.

The collecting funnel D is placed beneath a conventional netted enclosure U. Faeces and food scraps J accumulate in the lower portion of the collecting funnel and may be removed, discharged or withdrawn by pumping from the water W/X. Thus, pollution of the body of water in which the netted enclosure is disposed will be prevented.

It will be evident to one skilled in the art that the enclosures described and illustrated herein may be provided with conventional float means and anchoring means, not illustrated, for maintaining the structural shape of the enclosure and its position in the surrounding aquatic environment as well known in the art.

What I claim is:

1. A shielding device for the temperature and pollution control of water in a farming enclosure for fish and other aquatic organisms comprising an anchoring means for maintaining said enclosure in a relatively static position in a surrounding body of water, and wherein at least a part of the enclosure is formed of a water impermeable material which comprises an upper peripherally substantially closed water-impermeable walled warm water shield open at its lower end and extending above the surface of the water to contain and to prevent lateral flow-off of the warmer water having lower unit weight; a central peripherally closed substantially water-impermeable walled cold water shield open at its upper end to prevent lateral flow-off of the cooler water having a higher unit weight; and a water impermeable bottom for said cold water shield constructed as a collecting funnel which is tapered downwardly and at its lowest point is provided with an outlet, said bottom preventing the cooler water of normally higher unit weight from sinking down while at the same time collecting the still heavier faeces and food scraps and said upper and central wall portions of said shields being vertically spaced from one another and joined by a connecting netting preventing the fish kept within the device from escaping while at the same time providing substantially free flow of water to and from said surrounding body of water and thereby permitting and exchange of substances dissolved in the water between the water contained within the shielding device and the outside water.

2. A cold water shield as claimed in claim 1 comprising a collecting funnel vertically disposed below the epilimnion of a body of water as an independent shielding device, wherein said cold water shield comprising said walls and bottom prevents the heavier cooler water from flowing off and forming an artificial hypolimnion of oxygen-enriched water within a limited space.

3. A collecting funnel as claimed in claim 1 as an independent shielding device, wherein said collecting funnel collects faeces and food scraps sinking down and permits easier removal thereof from the water, for the purpose of pollution control in conventional fish enclosures.

4. A shielding device as claimed in claim 1, characterized in that said shields are provided with an auxiliary mechanism which, while ensuring the supply of fish and/or other aquatic organisms with food and oxygen, permits the lowering and raising of said shields.

5. A shielding device according to claim 1 wherein said warm water shield comprises a water impermeable cover to prevent water from flowing off upwardly from the top of the warm water shield.

6. A shielding device as claimed in claim 1, characterized in that said shields are formed of substantially water-impermeable and substantially heat-insulating walls, especially sheet material.

7. A shielding device as claimed in claim 6, characterized in that it is formed at least partially of a semipermeable material which permits the exchange of oxygen and/or the exchange of other substances dissolved in the water.

8. A shielding device according to claim 5 wherein said upper portion and cover are in the form of an inverted cup and said central portion and bottom portion are in the form of a cylindrical tank having an open top and a sloping bottom, the diameter of the top of said central portion being substantially equal to the diameter of the bottom of said upper portion.

9. A shielding device according to claim 8 wherein the bottom edge of said upper portion is vertically spaced from the top edge of said central portion.

10. A fish farming device comprising a warm water shield enclosure for forming a warmer epilimnion in a surrounding body of cooler water comprising a peripherally closed water impermeable vertical single wall structure extending above the surface of said surrounding body of water and sufficiently below said surface to enclose the warmer water having lower unit weight than the surrounding water and provided with an anchoring means to maintain said enclosure in a relatively static position, said wall defining an enclosure open only to the atmosphere at its top and open to said body of surrounding water only at its bottom and laterally completely closed with respect to said surrounding body of water along its sides and at its top whereby the warmer water having a lower unit weight is enclosed within said shield and is prevented from flowing off laterally, and means for supplying water warmer than said surrounding body of water to the interior of said enclosure thereby maintaining an artificial warmer epilimnion within said enclosure.

* * * * *